United States Patent [19]
Steger

[11] 3,977,257
[45] Aug. 31, 1976

[54] AUDIO DOSIMETER

[75] Inventor: James O. Steger, Muncie, Ind.

[73] Assignee: Ball Corporation, Muncie, Ind.

[22] Filed: Nov. 11, 1974

[21] Appl. No.: 522,915

Related U.S. Application Data

[63] Continuation-in-part of Ser. No. 383,292, July 27, 1973, Pat. No. 3,884,086.

[52] U.S. Cl. ................................. 73/558; 179/1 N
[51] Int. Cl.² ......................................... G01H 3/14
[58] Field of Search ............ 73/555, 556, 557, 558, 73/559; 179/1 N; 340/261

[56] References Cited
UNITED STATES PATENTS

| | | | |
|---|---|---|---|
| 3,014,550 | 12/1961 | Goles | 73/558 |
| 3,696,206 | 10/1972 | Ida et al. | 73/558 |
| 3,747,703 | 7/1973 | Knowd et al. | 73/558 |
| 3,778,552 | 12/1973 | Edinborgh | 73/558 |
| 3,868,857 | 3/1975 | Maddox | 73/558 |
| 3,884,086 | 5/1975 | Steger | 73/558 |

*Primary Examiner*—Herbert Goldstein
*Attorney, Agent, or Firm*—Cushman, Darby & Cushman

[57] ABSTRACT

An audio dosimeter for determining the exposure to noise as a function of both time and noise level. Input sound energy is appropriately weighted so as to account for the effect thereof on the human ear. The weighted sound signal is then utilized to gate pulses of selected discrete frequency levels to a counter, such that as the sound level increases, correspondingly higher frequency pulses are coupled to the counter. The counter stores the count therein until read out by an appropriate display device.

7 Claims, 6 Drawing Figures

AUDIO DOSIMETER

This application is a continuation-in-part of U.S. Pat. application Ser. No. 383,292, filed July 27, 1973, now U.S. Pat. No. 3,884,086.

BACKGROUND OF THE INVENTION

The physiological effects of sound energy have been appreciated for some time. However, it was not until the passage of the Walsh-Healey Act that quantitative limits have been set on the permissible exposure of the human ear to sound or noise. Accordingly, there have been substantial efforts to provide an instrument which would help industry to determine their degree of conformance to the quantitative noise requirements of the Walsh-Healey Act.

As sound waves travel they radiate outward from their source. As the waves cover an increasingly large area, the strength thereof diminishes. A good rule of thumb is that the amplitude of waves are reduced by one-half when the distance is doubled, assuming of course that the sound is radiating from a relatively small source compared to the distance from the source. In addition, the human ear hears without damage pressure levels that are approximately 100,000 times stronger than the lowest pressure level that it can detect. Because the ear is sensitive to differentials in sound intensity, a sound reference unit was developed termed the decibel (dB). A decibel is mathematically defined as:

$$dB = 20 \log_{10} \frac{A_2}{A_1}$$

where $A_1$ is the lowest pressure level that the human ear can detect and $A_2$ is the pressure level measured. Thus, one dB corresponds to a pressure level ratio of 1.12:1, 6 dB corresponds to a pressure level ratio of 2:1 and 40 dB corresponds to a pressure level ratio of 100:1. A sound intensity of 130 dB is usually considered the threshold of pain.

It is well-known that sound intensity and loudness differ because the human ear is more sensitive to certain frequencies of sound than to others. Thus, a tone at 5000 Hz will be much louder than a tone of 100 Hz even though both are transmitted with the same sound pressure. A system for measuring loudness, that is, sound intensity as measured by the human ear, was developed by weighting the intensity of sound in accordance with the frequency thereof. Thus, a commonly designated "A" weighted filter has been developed which accomplishes this by providing a frequency response which approximates the hearing response of the human ear.

Noise limits as established by the U.S. Department of Labor under the Walsh-Healey Act use the A weighted decibel (dBA) scale to define the noise limits for industrial environments. These limits are derived from statistical studies of hearing losses and are set forth as follows:

TABLE 1

| Duration of Daily Exposure | Allowable Level |
|---|---|
| Hours | dB (A) |
| 8 | 90 |
| 6 | 92 |

TABLE 1-continued

| Duration of Daily Exposure | Allowable Level |
|---|---|
| 4 | 95 |
| 3 | 97 |
| 2 | 100 |
| 1½ | 102 |
| 1 | 105 |
| ½ | 110 |
| ¼ | 115 |

Figures 1, 2, 3:
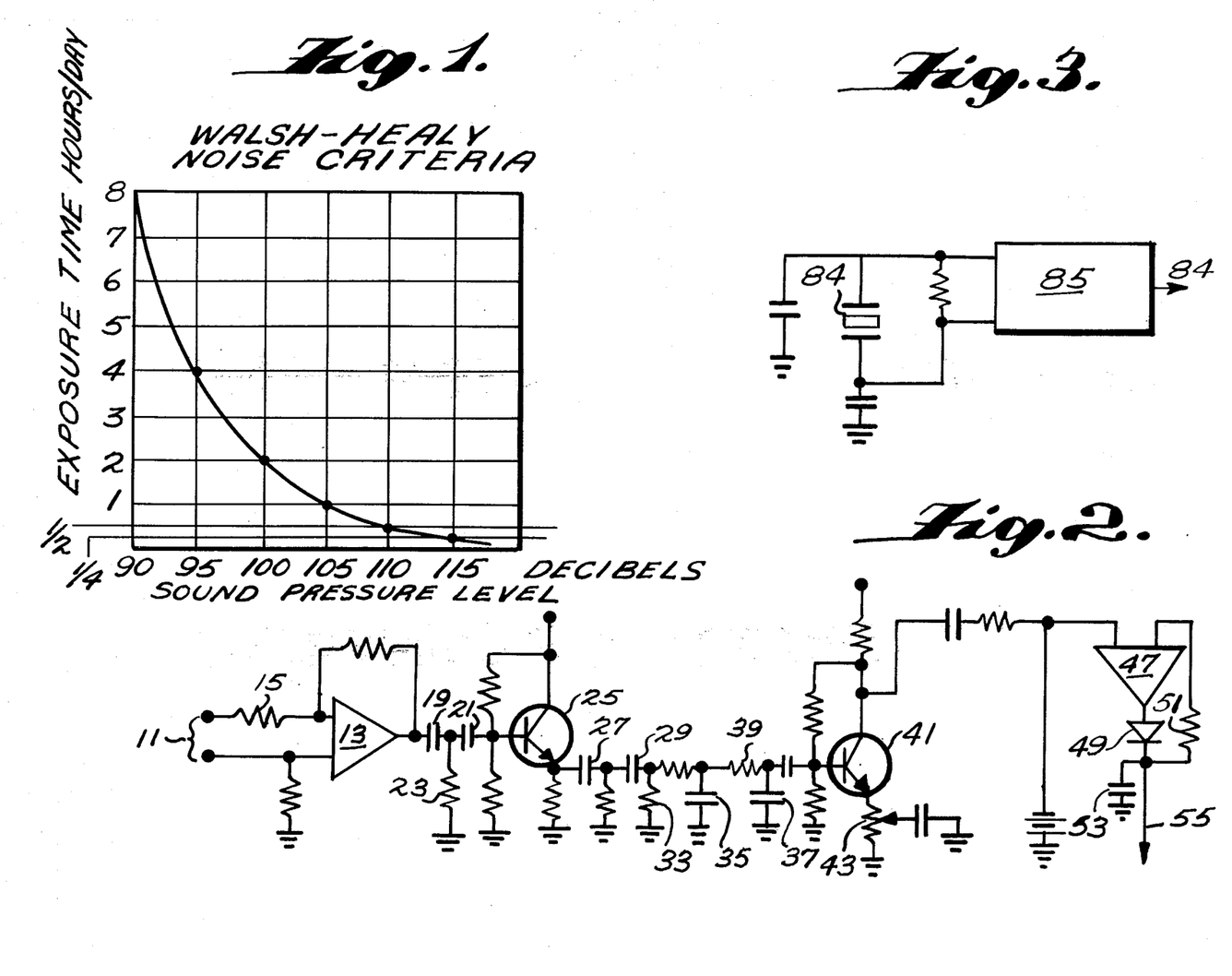
FIG. 1 is a graphical display of the Walsh-Healey Act requirement of permissible human exposure time in hours per day v. sound pressure level in dB(A)
FIG. 2 is a schematic circuit diagram of the A weighted filter and input circuit of the audio dosimeter of this invention.
FIG. 3 is a schematic diagram of the clock pulse generator of this invention.

A graphical relationship of the permissible human exposure time in hours per day vs. sound level in dB(A) as set out in Table 1 is shown graphically in FIG. 1 wherein the exposure time is represented by the ordinate and the sound pressure level as measured by the human ear is represented by the abscissa. From FIG. 1, a person could be exposed to a maximum of eight hours of noise at a 90 dB(A) pressure level. However, if the noise level increases to 95 decibels, it can be seen that a person can be exposed thereto for only 4 hours before the limits of the Walsh-Healey Act are exceeded. When the noise level rises to 115 dB(A), the total time exposure is only one-fourth of an hour.

Under actual working conditions, however, a person may be exposed to varying levels of sound pressure. Thus, for example, in one 8 hour day a person may be exposed to 2 hours of noise at 90 dB(A), 1 hour of 95 dB(A) noise and one-half hour of 100 dB(A) noise with the remaining noise exposure time being below 90 dB(A). In this noise environment, the exposure to 2 hours of 90 dB(A) noise accounts for 25% of the maximum allowable noise exposure for the day. The 1 hour of 95 dB(A) exposure accounts for 25% of the maximum allowable noise exposure and the one-half hour of 100 dB(A) noise exposure accounts for 25% of the maximum allowable noise exposure. Accordingly, during the aforementioned 8 hour exposure period, the person was exposed to 75% of the maximum allowable noise exposure.

In order to determine the exposure of an individual to noise, a portable audio dosimeter worn by the individual during the entire exposure period must be provided. There have been a number of such dosimeters provided in the past. For example, in U.S. Pat. No. 3,144,089, issued to Lane et al., there is shown a noise exposure meter wherein noise is detected by a microphone and converted to an electrical signal. The signal is rectified and then coupled to an electro-chemical integrator, such as a coulometer. The coulometer integrates the current passing therethrough so that the position of the gap of the coulometer is representative of the total noise exposure of the person wearing the meter. This dosimeter, however, does not take into account the sensitivity of the ear to various frequencies of the sound spectum and includes no means for determining whether the accumulated noise over a period of time is in compliance with the Walsh-Healey Act.

U.S. Pat. No. 2,884,085 to Wolf-Wito von Wittern et al. illustrates another example of past efforts to provide noise exposure meters. This patent discloses a microphone for detecting sound pressure levels and for converting the pressure levels to a corresponding electrical signal. An intensity discriminator is provided which consists of a plurality of vacuum tubes, each of which is gated at successively higher discrete voltage signal levels. As each vacuum tube is gated on, a relay is actuated to initiate operation of a clock. Accordingly, at a first noise level the first vacuum tube is gated and the clock associated therewith starts to operate. As the noise intensity increases, the second vacuum tube is gated to thereby initiate operation of a second clock associated therewith and so on until the noise intensity reaches such a level that each of the vacuum tubes are gated and each of the clocks are operating. After a predetermined period of time, the noise exposure at each sound level can be determined by reading the clocks. However, there is no means for taking into account the ear's sensitivity to different frequencies of sound and in addition a plurality of relay operated clocks are required which operate at relatively high levels of power. Thus this noise exposure meter could not be readily carried about by a person on the job for extended periods of time.

U.S. Pat. No. 3,696,202 issued to Ida et al. discloses an audio dosimeter which detects sound pressure levels and converts these levels to a weighted signal representing the loudness of the sound as detected by the human ear. This signal is then amplified and coupled to an electro-chemical device, such as a coulometer, for detection of the accumulated noise intensity level over a period of time. This patent, however, does not disclose a well-defined means for preventing noise levels lower than 90 dB(A) from being accumulated and stored by the coulometer. Accordingly, the coulometer will provide an output which indicates that the accumulated noise level is higher than it actually is. In addition, accurate response to peak noise levels is not provided since peak storage capacitors store the peak noise levels thereby distorting the time variance of the noise pressure signal. Accordingly, the coulometer provides a readout which once again is higher than the actual accumulated noise level.

Stevens et al. U.S. Pat. No. 3,697,973 discloses yet another dosimeter which is carried about in a relatively large case. The detected sound pressure level is appropriately filtered by an A weighted filter, squared by a square law detector and then converted to a pulse train by means of unijunction pulser. Because of the square law detector, the output of the Stevens et al dosimeter is not an accurate integration of the noise level input and the use of a unijunction pulser subjects the dosimeter to possible error due to drift within the electronic circuitry.

Other devices are available, such as disclosed in U.S. Pat. No. 3,594,506 issued to Bauer et al., which measure the loudness of sound waves but do not provide an indication of the quantity of noise to which a person is subjected and does not indicate compliance with the Walsh-Healey Act.

From the foregoing it can be seen that there is a substantial need for an accurate, portable audio dosimeter for detecting accumulated noise with respect to time so that compliance with the Walsh-Healey Act can be ascertained.

SHORT STATEMENT OF THE INVENTION

Accordingly, applicant's invention is related to a portable audio dosimeter for individual use which includes a means for sensing and converting sound to an electrical signal representing the sound. The signal is filtered by an A weighted filter which has a frequency response which approximates the frequency response of the human ear. The output of the A weighted filter is converted to a DC signal. Pulses from a clock pulse generator are divided by a first divider circuit wherein the divider provides a plurality of outputs each supplying a discrete clock pulse frequency. The outputs of the divider are each coupled to an associated gate. The gates are enabled by the DC voltage from the weighted filter such that the gate associated with the lowest frequency output of the divider is enabled when the DC voltage reaches a level representing the 85 dB(A) noise level. The next gate which is associated with the next highest frequency output of the divider is enabled when the DC voltage reaches a level corresponding to 90 dB(A) level and so on. The outputs of these gates are combined and coupled to an output counter which serves as an integrator.

In addition, in order to measure decibel levels between 85 and 90, 90 and 95, etc., a counter circuit is provided having a plurality of outputs therefrom which are coupled to associated gates. A voltage divider determines the input voltage level to each of a plurality of comparators, the outputs of which enable the associated gates. Thus, as the dB level rises from 85 dB to 90 dB in ½ decibel increments, increasingly more gates are enabled to pass the delayed output pulses from the counter therethrough to the output counter. In this manner, the dB level detected can be measured in increments of one-half dB from 85 dB up to 120 dB. The output of the counter is an indication of the accumulated noise level detected by the audio dosimeter of this invention. Should the limits of the Walsh-Healey Act be exceeded, that is, the counter exceed a predetermined count level, an overload circuit is energized which indicates that the accumulated noise limit has been exceeded.

BRIEF DESCRIPTION OF THE DRAWINGS

Other objects, features and advantages of this invention will become more fully apparent from the following detailed description, appended claims and the accompanying drawings, in which:

DETAILED DESCRIPTION OF THE PREFERRED EMBODIMENT

Refer now to FIG. 2, which is a schematic diagram of the input circuit and A filter of the dosimeter of the present invention. A sound pressure transducer (not shown) is connected to the input terminals 11 of the audio dosimeter. The transducer may be of any conventional type such as, for example, a microphone. The output of the transducer is connected to a preamplifier 13 through an input resistor 15. Amplifier 13 is a typical integrated circuit operational amplifier of conventional design. Feedback resistor 17 establishes the amplification or gain of the amplifier 13. The output of the amplifier is coupled to a high pass filter which includes capacitors 19 and 21 and resistor 23. This filter is part of a weighting filter which has a transfer characteristic which is proportional to the response of the human ear. Capacitors 19 and 21 and resistor 23 attenuate the low frequency components of the noise frequency spectrum. Transistor 25 is connected as an emitter follower and couples the high pass filter to a low pass filter formed by capacitors 27 and 29 and resistors 31 and 33. Capacitors 35 and 37 and resistor 39 provide additional tailoring of the transfer characteristics of the A filter so that the filter provides a transfer function which is essentially proportional to the response of the human ear.

The output of the A weighted filter is connected to the base terminal of transistor 41 which amplifies the output of the A weighting network. Potentiometer 43 is connected to the emitter terminal of transistor 41 with the other terminals thereof connected to ground. The midpoint of the potentiometer is connected via a bypass capacitor 45 to ground. Accordingly, by varying the setting of the potentiometer, the amplification of the output of the A weighting filter is adjusted. Thus, the potentiometer 43 can be utilized to calibrate the audio dosimeter.

The output of transistor 41 is coupled to an active rectifying circuit comprising an operational amplifier 47 and a diode 49. Feedback resistor 51 is provided in combination with operational amplifier 47 to linearize the rectifying characteristics of the diode 49 in a known manner. Capacitor 53 is provided for filtering out the AC component of the rectified signal.

Figure 4A:
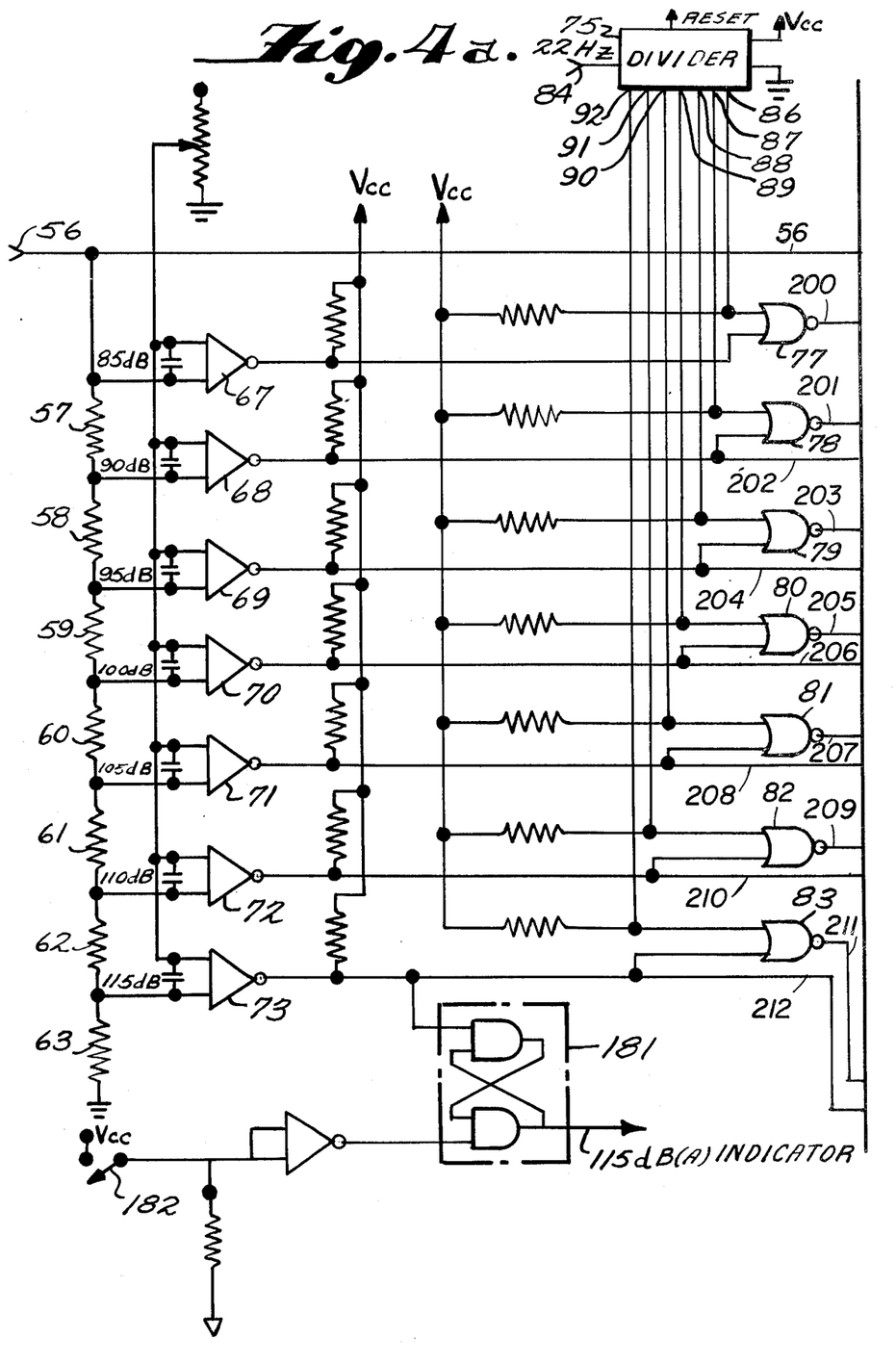
FIGS. 4a, b and c are a schematic diagram illustrating the manner in which the noise pressure level is accumulated with respect to time.
Figure 4B:
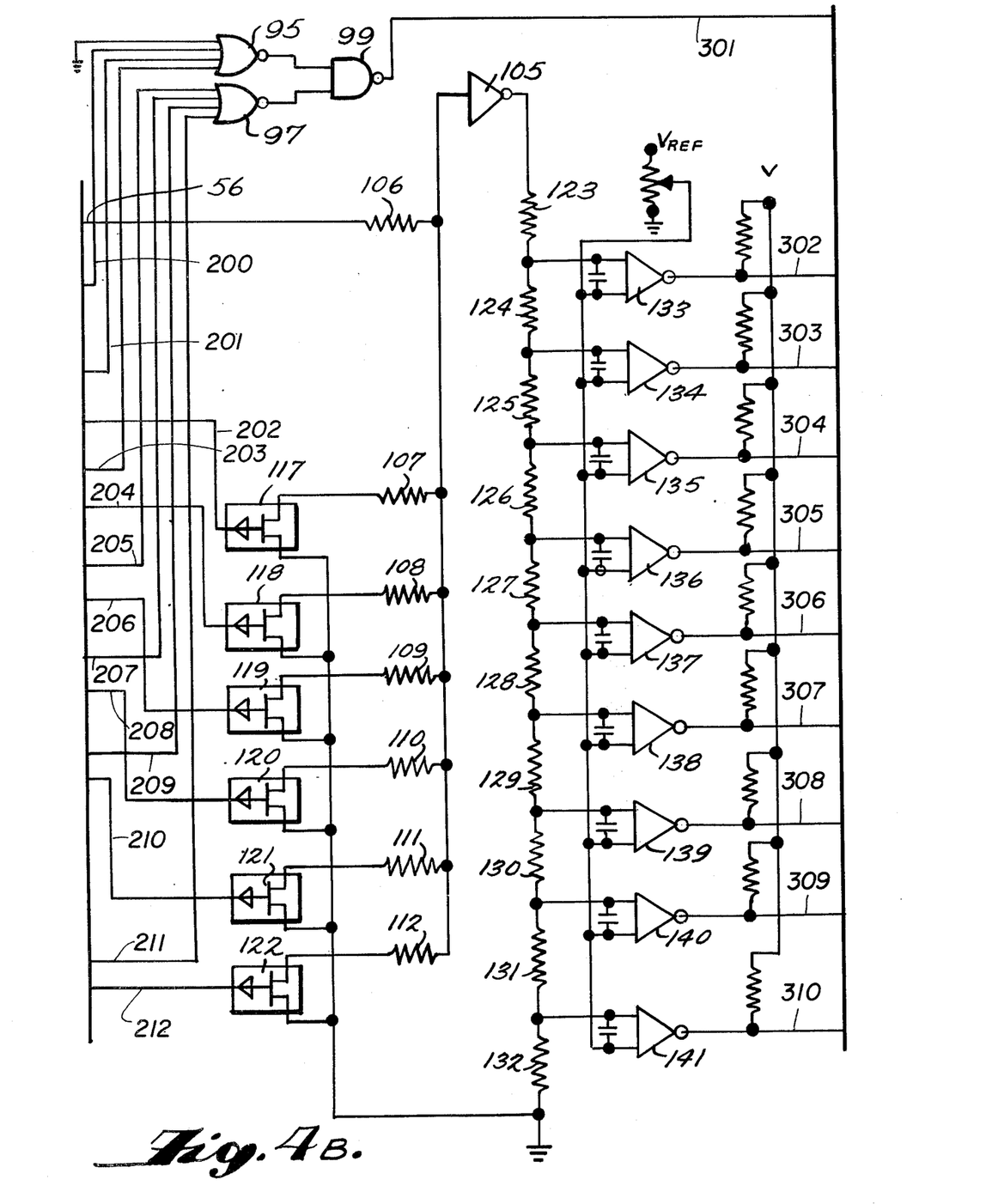
Figure 4C:
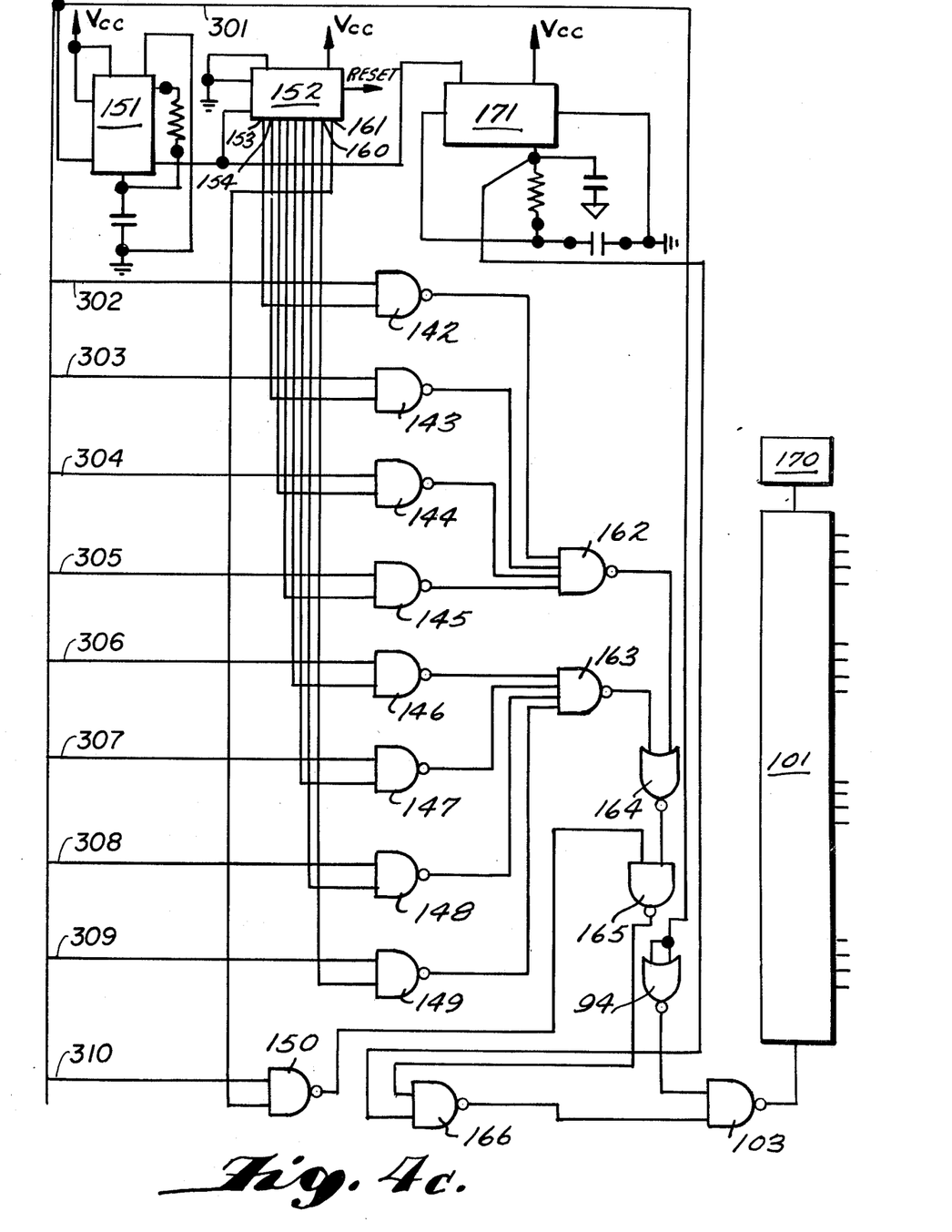

Refer now to FIGS. 4a, b and c where there is shown the circuit for integrating the noise level with respect to time. The interconnecting lines extending from FIG. 4a to FIG. 4b are designated by the numerals 56 and 200–212 and the interconnecting lines between FIG. 4b and FIG. 4c are designated by the numerals 301–310 in order to enable a clear correspondence between the drawings. The DC output at terminal 55 of the rectifier is connected to terminal 56 of a voltage divider circuit which includes resistors 57–63. The voltage divider divides the voltage level from the output of the active rectifier in 5dB steps from 85 dB(A) to 115 dB(A). A series of digital comparators 67–73 are connected to the taps of the attenuator with the outputs of the comparators each being connected to one terminal of an associated gate 77–83. The other input terminals of the gates 77–83 are connected to terminals 86–92, respectively, of divider 75.

Refer now briefly to FIG. 3 where there is shown a clock pulse generator. A quartz crystal 84 is provided having a stable frequency of 364.0888 kHz. The quartz crystal is connected in circuit in a conventional manner to form a quartz crystal oscillator. Since such oscillators are well known in the art, a detailed discussion of the operation thereof will not be presented herein. The output of a quartz crystal oscillator is coupled to a divider 85 which has 14 binary divider stages. Accordingly, the output of the divider is a clock pulse signal having a frequency of 22 Hz. This output is coupled to the divider 75 illustrated in FIG. 4a. Divider 75 includes at least 7 stages of binary dividers so that the output at terminal 92 is 11 Hz, the output at terminal 91 is 5.5 Hz., etc.

The outputs of gates 77, 78 and 79 are each coupled to a NOR gate 95 shown in FIG. 4b. The outputs of gates 80–83 are each coupled to a second NOR gate 97. The outputs of NOR gates 95 and 97 are combined in a NAND gate 99, the output of which is coupled to a counter circuit 101 via a NAND gate 103 shown in FIG. 4c.

The circuits so far decribed detects the input noise in 5 decibel intervals, that is, 85 dB(A), 90 dB(A), 95 dB(A), etc. While measuring the noise level in a given environment in 5 decibel intervals is normally sufficient to provide an indication of the accumulated noise level experienced over a given period of time, in some cases further accuracy is required. Accordingly, by the present invention a means is provided for measuring the noise level of a given environment in ½ decibel intervals from 85dB(A) up to 120 dB(A). Referring to FIGS. 4b and 4c, there is disclosed a variable voltage divider which includes a constant resistor 106 which is connected at one end to the terminal 56 illustrated in FIG. 4a and at the other end to an inverting amplifier 105 and to a series of resistors 107–112. Each of the resistors 107–112 is connected at its other end to the source terminals of associated FET gates 117–122. The drain terminals of the FET gates 117–122 are each connected in common to a source of reference potential such as ground. The gate terminal of the FET gate 117 is connected to the output of the 90 dB(A) comparator 68 and is turned on when a voltage corresponding to a noise level of 90 dB(A) is coupled to the input terminal 56. Thus, when the noise level detected is below 90 dB(A), each of the gates 117–122 is turned off and hence the input voltage coupled to terminal 56 is coupled directly to the input of the inverting amplifier 105. However, when the voltage reaches a value corresponding to 90 dB(A), the FET gate 117 is turned on, thereby connecting resistor 107 in series with resistor 106 to provide a voltage divider, the center tap of which is connected to the input of amplifier 105. The output of amplifier 105 is connected to a voltage divider which includes resistors 123–132. Connected to the taps of the voltage divider which includes the resistors 123–132 are a series of comparators 133–141. The outputs of the comparators 133–141 are connected to one input of NAND gates 142–150, respectively, shown in FIG. 4c.

The voltage divider including the resistors 106 and 107 is designed so that when the voltage at terminal 56 corresponds to 90.5 dB(A), comparator 133 is turned on, thereby enabling gate 142. When the voltage at terminal 56 corresponds to 91 dB(A), then comparators 133 and 134 are both turned on thereby enabling both NAND gates 142 and 143. It can be seen that as the noise level at terminal 56 increases up to a level corresponding to 94.5 dB(A), progressively more of the NAND gates 142–150 will be enabled until at the 94.5 dB(A) level each of the NAND gates 142–150 are enabled.

When the input DC voltage corresponding to a noise level of 95 dB(A) appears at terminal 56, FET gate 118 is turned on together with FET gate 117, thereby connecting resistors 107 and 108 in parallel with one another and in series with resistor 106. Thus the voltage divider comprising the resistors 106–108 is reset such that an input voltage corresponding to 95.5 dB(A) turns on the comparator 133. It can be seen as the voltage level continues to rise up to a level corresponding to 99.5 dB(A), a correspondingly increasing number of comparators 133–141 provide an enabling signal to the NAND gates 142–150.

When the input voltage rises to a level corresponding to 100 dB(A), the FET gate 119 is turned on together with the gates 117 and 118. Thus, the voltage divider at the input of the inverting amplifier 105 is again changed such that when the input voltage level reaches a level of 100.5 dB(A), the comparator 133 provides an enabling pulse to the NAND gate 142 and so on as the input noise level continues to rise to a level of 120 dB(A).

The output of the NAND gate 99, which it will be remembered is of a varying pulse rate depending upon the NOR gates 77–83 enabled, is coupled to a delay circuit 151 shown in FIG. 4c which in the preferred embodiment is a flip-flop. The output of the delay circuit 151 is coupled to the input of a decade counter 152 which in the preferred embodiment is a Johnson counter. When a pulse is coupled from the delay circuit 151 to the counter 152, a first pulse is generated at the output terminal 153 which output is coupled to the other input terminal of NAND gate 142. When the second pulse from the delay circuit 151 is coupled to the counter 152, a second pulse is generated at output terminal 154, which signal is coupled to the other input terminal of NAND gate 143. Thus, as more pulses are received by the counter 152, each of the output lines 153–161 are sequentially energized with pulses which are coupled to the other input terminals of the NAND gates 142–150, respectively.

The outputs of NAND gates 142–145 are coupled to a NAND gate 162 while the outputs of NAND gates 146–149 are coupled to NAND gate 163. The outputs of NAND gates 162–163 are connected to the input terminals of a NOR gate 164. The output of NOR gate 164 and the output of NAND gate 150 are each connected to a NAND gate 165, with the output of NAND gate 165 being coupled to NAND gate 166. The output of NAND gate 166 is connected to one input of NAND gate 103 with the other input thereof being derived from the output of NAND gate 99 illustrated in FIG. 4b. The output of NAND gate 103 is connected to the counter-accumulator 101 which accumulates or integrates the pulses received over a predetermined period of time to provide an indication of the quantity of noise to which an individual is subjected.

In operation, assume for example that a noise level of 93 dB(A) is in the environment in which the dosimeter of the present invention is positioned. The input signal at terminal 11, after being appropriately weighted by the A weighted filter and converted to a DC signal, is coupled to input terminal 56 illustrated in FIG. 4a. Since the signal at terminal 56 corresponds to a noise level of 93 dB(A), comparators 67 and 68 will provide an output signal for enabling NOR gates 77 and 78. Thus, NOR gate 77 will gate the pulse train signal appearing at terminal 86 to the NOR gate 95 shown in FIG. 4b and in addition, NOR gate 78 will couple the pulse train signal appearing at terminal 87 to the NOR gate 95. The remaining output signals from counter 75 are not coupled through the remaining NOR gates 79–83 since none of these gates are enabled by signals from the comparators 69–73. The output of NOR gate 95 is a pulse train having a frequency equal to the frequency of the pulse train at the output 87 of counter 75 since this frequency is twice the frequency of the signal appearing at terminal 86 of the counter 75. This pulse train is coupled to counter-accumulator 101 via NAND gate, NOR gate 94 and NAND gate 103.

At the same time that the counter 101 is counting the pulse train signal from the NAND gate 99, the FET 117 is turned on by the output of the comparator 68. Hence, resistor 107 is connected in series with resistor 106 to form a voltage divider. The input signal to input terminal 56 is thus coupled to the inverting amplifier 105 and then to the voltage divider comprising resistors 123–132. Since the input signal level corresponds to a noise level of 93 dB(A), comparators 133–138 generate output signals for enabling gates 142–147. Thus, the NAND gates 142–147 each sequentially couple a pulse generated by counter 152 to the NOR gate 164 via NAND gates 162 and 163 as each of the first six pulses from the pulse train output of NAND gate 99 are coupled to the counter 152 from delay circuit 151. More specifically, when the first output pulse from NAND gate 99 is coupled to the counter 101, a delayed pulse is coupled to the counter 152 which in turn generates a pulse which is coupled to the counter 101 via the NAND gate 142, NAND gate 162, NOR gate 164, NAND gate 165, NAND gate 166 and NAND gate 103. The purpose for delaying the pulse coupled from counter 152 to the counter-accumulator is to avoid coincidence of the pulse with the pulse output of NAND gate 99 which is coupled directly to counter-accumulator.

When the next pulse output of NAND gate 99 is coupled to the counter 101, delay circuit 151 provides a delayed pulse to the counter 152. Counter 152 then generates a pulse on output 154 which is coupled to the NAND gate 143. This pulse is in turn coupled to the counter 101 since NAND gate 143 has been enabled by the output of comparator 134. This process repeats itself for each pulse output of the NAND gate 99 until the seventh pulse is provided at the output of NAND gate 99. When the seventh pulse is provided at the output of NAND gate 99, it is coupled to the counter 101 but a second delayed pulse is not coupled thereto since the NAND gate 148 has not been enabled by comparator 139. It can be seen that for the eighth and ninth pulses coupled to the counter 101, a second delayed pulse will not be coupled thereto since the NAND gates 149 and 150 will also not be enabled. Thus, for the first 10 pulses counted by the counter 101, six extra delayed pulses will be coupled thereto for accumulation therein, when the noise level detected is 93 dB(A).

To insure that the delayed pulses from counter 152 do not overlap the pulses coupled directly from NAND gate 99 to counter-accumulator 101, a second delay flip-flop circuit 171 is provided which is responsive to the output of delay flip-flop 151 to provide a gating pulse to NAND gate 166 which prohibits the passage of a pulse therethrough until the initial pulse coupled from NAND gate 99 has terminated. The delay times of the flip-flops 151 and 171 can be appropriately adjusted by varying the resistors and capacitors illustrated and in the preferred embodiment the two delay circuits are formed on a single chip in what is commonly termed a Dual D flip-flop.

The counter accumulator 101 requires 3333 pulses for a 100% or full-scale reading. Thus, if the 93 dB(A) noise level is maintained, the counter 101 will accumulate to a count of 333 in less than 6 hours. If on the other hand the noise level was 115 dB(A), the 11 Hz signal output of divider 75 would be coupled to the accumulator counter 101, thereby resulting in a count of 3333 being achieved in one-fourth of an hour.

When the counter has reached its maximum count, an output is provided to an overload circuit 170 which energizes an appropriate indicator for indicating that the maximum exposure to noise in an 8-hour period has occurred. When after the maximum 8-hour exposure has been achieved or measuring of the noise accumulation for a new 8-hour period is beginning, a reset button 182 shown in FIG. 4*a* is pushed which resets the counter 75, the counter 101, the counter 152, the overload indicator 170 and the 115 dB indicator 181 to thereby start a new cycle of operation.

By using a quartz crystal oscillator in combination with a divider chain, extremely accurate clock pulses can be generated for driving the counter integrator 101. In addition, by employing a digital binary counter 101 for long term integration, several problems with prior art techniques are overcome. Thus, for example, problems of drift with respect to time are eliminated since the counter can store its count indefinitely. In addition, the accuracy of the counter depends only on the integration clock rates and the number of stages of the integrator. Accordingly, it can be seen that the counter provides an extremely accurate output. In addition, once the output of the counter has been detected, the counter can be reset almost instantaneously by pushing reset switch 182.

By using digital logic circuits utilizing CMOS circuitry, the dosimeter of this invention utilizes extremely low power levels thereby extending the typical battery life used for powering the dosimeter.

While the present invention has been disclosed in connection with a preferred embodiment, it should be understood that other alternative embodiments may be utilized within the spirit and scope of the invention as defined by the appended claims.

What is claimed is:

1. An audio dosimeter comprising
    means for sensing and converting sound to an electrical signal representing said sound;
    weighted filter means for filtering said signal;
    said filter having a frequency response which approximates the frequency response of the human ear;
    means for generating a DC voltage having a magnitude that is proportional to the filtered output of said weighted filter;
    a source of clock pulses;
    a frequency divider means responsive to said source of clock pulses and having multiple outputs for providing a plurality of discreet frequency outputs;
    each discreet frequency corresponding to a predetermined noise level;
    a counter, and means responsive to said DC voltage for gating selected ones of said discreet frequencies to said counter;
    means for generating a delayed pulse for each gated output pulse from said gating means; and
    means responsive to said DC voltage for selectively gating said generated delayed pulses to said counter;
    said selective gating means gating an increasing number of delayed pulses as said voltage increases from one predetermined voltage level to the next to thereby increase the count rate of said counter as said noise level increases between each of said preselected noise levels.

2. The audio dosimeter of claim 1 wherein said means responsive to said DC voltage for gating selected ones of said discrete frequencies to said counter includes:
    a first voltage divider means including a plurality of output terminals for dividing said DC voltage,
    a first plurality of comparator means, each being connected to one of said output terminals of said voltage divider, each succeeding comparator generating a gate enabling output when said DC voltage increases by a predetermined magnitude, and
    a plurality of gating means, one each connected to an output of said frequency divider, each being enabled by the output of an associated comparator to gate said discrete frequency outputs from said frequency divider to said counter,
    wherein, as said DC voltage level increases, the gates associated with increasingly greater discrete frequency outputs are enabled.

3. The audio dosimeter of claim 2 wherein said means for generating a delayed pulse for each gated output pulse from said gating means comprises
    means for delaying the gated output pulses from said gating means, and
    means for coupling said delayed pulses sequentially to said selective gating means.

4. The audio dosimeter of claim 3 wherein said means for selectively gating said generated delayed pulses to said counter comprises:
    means for dividing the voltage difference between said predetermined voltage levels into a plurality of discrete voltage levels,
    comparator means responsive to the output of said dividing means for generating gate enabling signals, wherein as said difference voltage increases past each of a plurality of said discrete levels corresponding to preselected noise levels, correspondingly increased gate enabling signals are generated, and
    a plurality of gates, each gate being enabled by an associated one of said comparator means, and each gate including means for receiving one of said delayed pulses so that as an increased number of gate enabling signals are generated by said comparator means, an increased number of delayed pulses are gated to said counter.

5. The audio dosimeter of claim 4 wherein said means for selectively gating said generated pulses to said counter comprises:
    a variable voltage divider for establishing a reference voltage level when sid DC voltage reaches each of said predetermined voltage levels,
    a voltage divider receiving the output voltage of said variable voltage divider and for dividing said output voltage into a plurality of discrete incremental voltages,
    a plurality of comparators connected to the taps of said voltage divider, an increasing number of said comparators generating gate enabling signals as said output voltage of said variable voltage divider increases past each of a plurality of discrete voltage levels,
    a plurality of gates, one each connected to the output of an associated one of said comparators, the output of said gates being connected to said counter, and
    means for distributing said delayed pulses sequentially to each of said gates,
    wherein as an increasing number of gates are enabled an increasing number of delayed pulses are coupled to said counter.

6. The audio dosimeter of claim 5 further comprising:
    means for varying the dividing factor of said variable voltage divider in accordance with said DC voltage.

7. The audio dosimeter of claim 6 wherein means for varying the dividing factor of said variable voltage divider comprises:

a plurality of voltage divider gating means each enabled by the enabling output signal of an associated one of said first plurality of comparator means, an increasing number of said voltage divider gating means being enabled as said DC voltage rises, a plurality of resistors connected to said first resistor and each being connected to an associated voltage divider gating means wherein as each voltage divider gating means is enabled its associated resistor is connected in circuit with said first resistor and in parallel with the resistors connected to other enabled voltage divider gates, wherein as the DC voltage increases past each of said predetermined levels, the dividing factor of said variable voltage divider is raised a predetermined amount.

* * * * *